Figure 1:
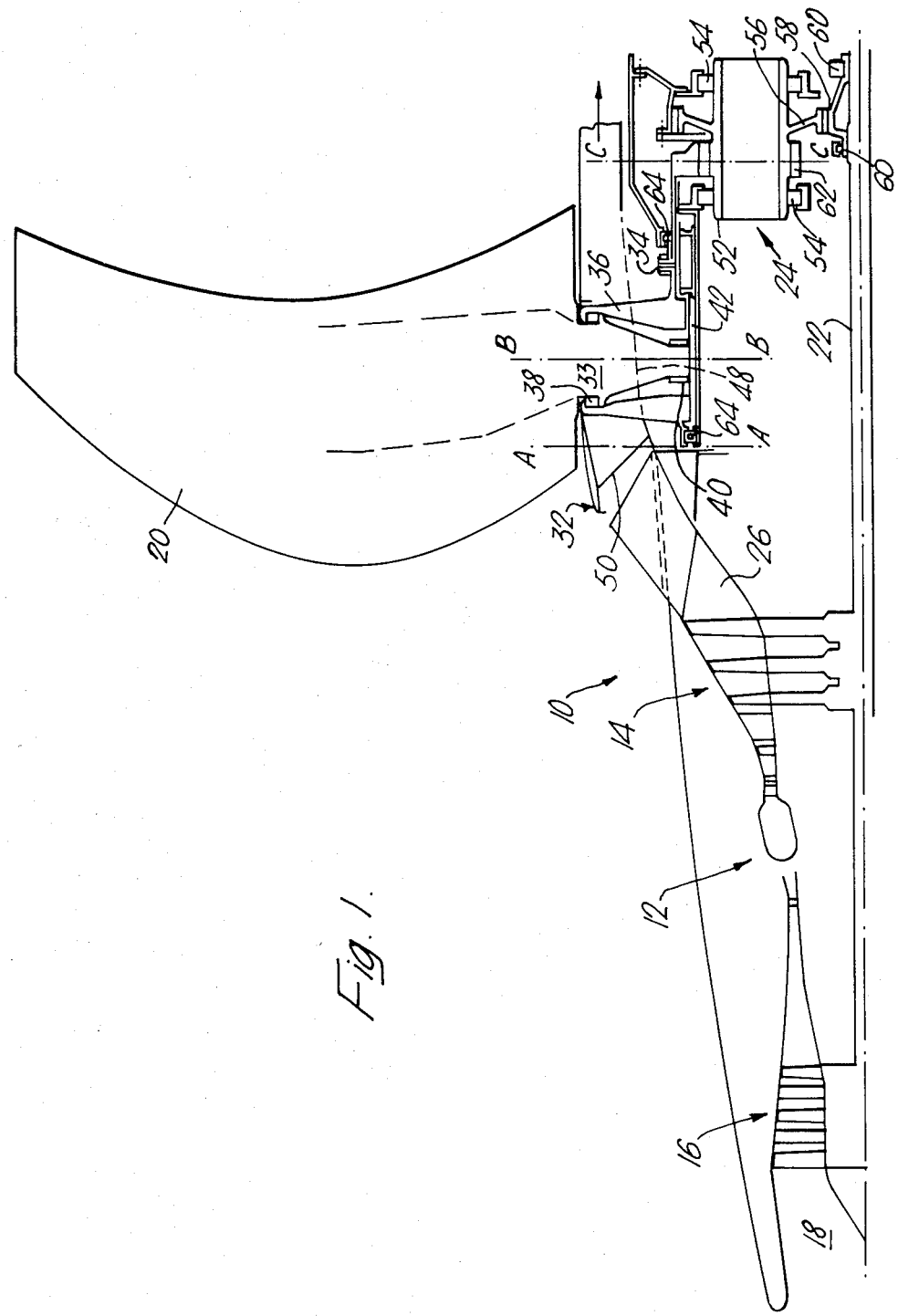

United States Patent [19]

Robey et al.

[11] Patent Number: 4,488,399
[45] Date of Patent: Dec. 18, 1984

[54] PROPFAN AIRCRAFT PROPULSION ENGINE

[75] Inventors: Charles W. Robey, Kings Newton; Harry W. Bennett, Duffield, both of England

[73] Assignee: Rolls-Royce Limited, London, England

[21] Appl. No.: 460,272

[22] Filed: Jan. 24, 1983

[30] Foreign Application Priority Data

Feb. 17, 1982 [GB] United Kingdom ............... 8204665

[51] Int. Cl.³ .............................................. F02K 1/46
[52] U.S. Cl. .................................................... 60/262
[58] Field of Search ..................... 60/226.1, 262, 263

[56] References Cited

U.S. PATENT DOCUMENTS

| | | | |
|---|---|---|---|
| 3,625,008 | 12/1971 | Hewson et al. | 60/226.1 |
| 3,811,791 | 5/1974 | Cotton | 60/226.1 |
| 4,055,949 | 11/1977 | Boudiques | 60/262 |
| 4,171,183 | 10/1979 | Cornell et al. | 416/223 R |
| 4,183,210 | 1/1980 | Snell | 60/262 |

FOREIGN PATENT DOCUMENTS

| | | |
|---|---|---|
| 586557 | 3/1947 | United Kingdom . |
| 588096 | 5/1947 | United Kingdom . |
| 601170 | 4/1948 | United Kingdom . |
| 809811 | 3/1959 | United Kingdom . |
| 1557817 | 12/1979 | United Kingdom . |

OTHER PUBLICATIONS

Flight International–1/16/82–pp. 112–114.

Primary Examiner—Louis J. Casaregola
Attorney, Agent, or Firm—Cushman, Darby & Cushman

[57] ABSTRACT

In a propfan engine, the need for an annular or chin-type intake when the propfan is mounted in front of the engine is avoided by mounting the propfan downstream of the engine. The engine exhaust is ducted to atmosphere through inner chutes which alternate with outer chutes through which ambient air flows. The alternate streams of exhaust gas and ambient air then flow through axial ducts which are located between adjacent blade mountings in the rotating hub of the propfan.

3 Claims, 2 Drawing Figures

PROPFAN AIRCRAFT PROPULSION ENGINE

This invention relates to a propfan driven by a gas turbine, in which the gas turbine includes a gas generator and some form of power turbine to drive the propfan through a reduction gear box, and the propfan is mounted downstream of the gas turbine.

A propfan can be defined as a form of high preformance propeller having a number of blades, typically about 8 to 10, each blade being thin and having a high degree of sweep. This arrangement delays shock wave formation and enables the blades to operate at a high power loading. An aircraft powered by a propfan engine can operate at about Mach 0.8 as opposed to conventional turbo-prop engine which limits flight speed to about Mach 0.6 because propeller tip speeds should not exceed the speed of sound, otherwise propulsive efficiency drops rapidly and noise levels increase. Also as compared with a turbo-fan engine, a propfan engine will consume up to 20 percent less fuel.

Proposals have been made for various arrangements of propfan and driving gas generator in which an upstream fan is driven through a gear box by a shaft extending from the gas generator. Such arrangements require an engine intake downstream of the propfan and these intakes either need to be annular or of the chin type. Both types of intake create aerodynamic penalties and the correct engine inlet conditions are difficult to achieve. In particular, when the engine is required to provide reverse thrust, the pitch of the propfan blades is reversed, and the blade roots could effectively block the engine intake unless special measures are taken to avoid this condition.

The present invention avoids these problems by locating the propfan downstream of the driving gas turbine allowing the gas turbine to have a normal intake. Also the rear mounted propfan engine does allow the engine to be located at the rear of the aircraft so that the sideways noise from the propfan does not impinge upon the aircraft fuselage or only that part of it which does not include a passenger cabin.

An aircraft propulsion engine comprising a gas generator, turbine means drivable by the gas generator and at least one propfan drivable by the turbine means through reduction gearing, the propfan being mounted for rotation co-axially with the core engine and the turbine means, and downstream of the turbine means, the gas generator and turbine means having an exhaust duct comprising a plurality of adjacent chutes, through alternate ones of which, the exhaust gases and ambient air flow, the propfan has a rotating hub structure in which axial passages are provided between adjacent blades of the propfan, the alternate flows of exhaust gases from the gas generator and the turbine means and ambient air being arranged to pass through the axial passages to atmosphere.

The turbine means may comprise a booster located upstream of the gas generator coupled to a turbine downstream of gas generator, or a free power turbine.

Figure 2:
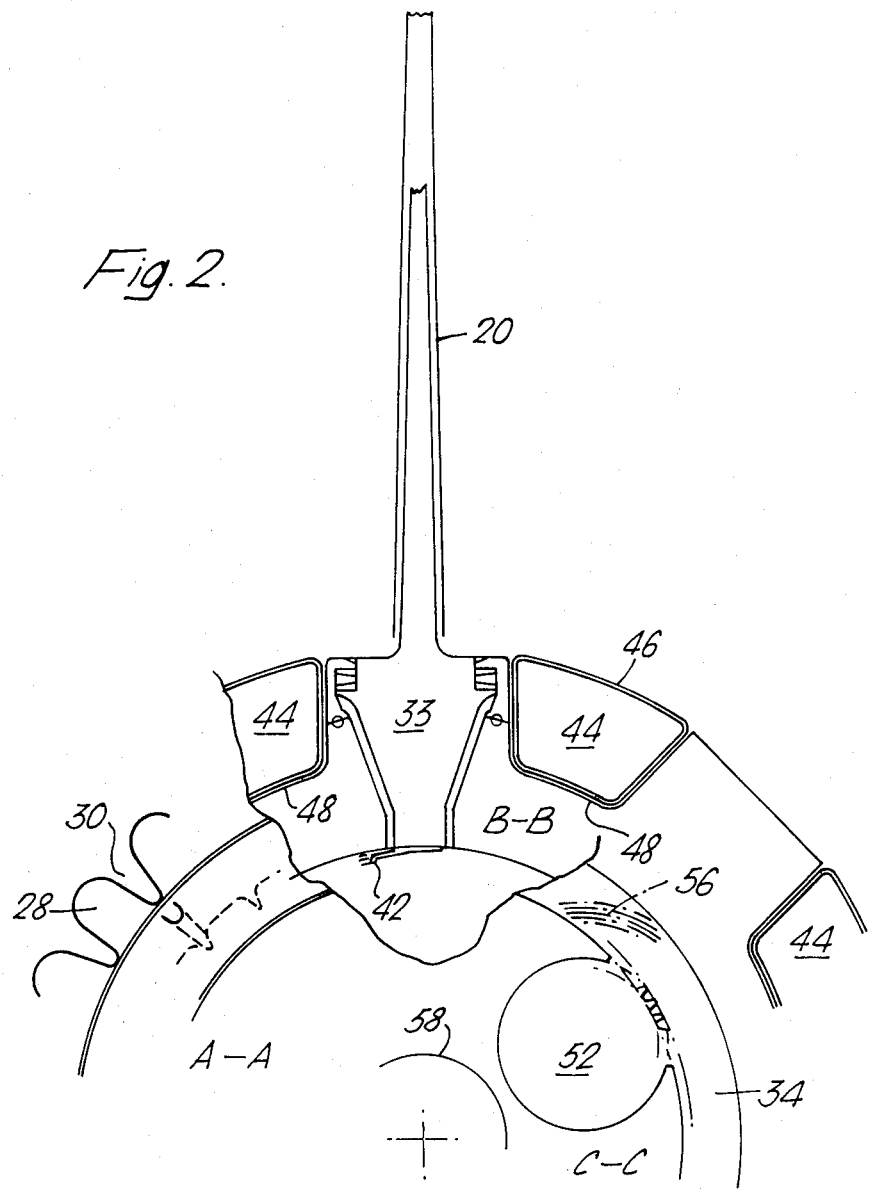

The present invention will now be more particularly described by reference to the accompanying drawings in which, FIG. 1 is a half side elevation in partially diagrammatic form of one type of propfan propulsion engine according to the present invention, and FIG. 2 is a composite of sections taken on lines AA, BB and CC in FIG. 1.

In the FIGS., a propfan propulsion engine 10 includes a gas generator 12, the details of which are not shown, but would typically comprise a compressor, a combustion apparatus receiving compressed air from the compressor and fuel, and a compressor driving turbine driven by the high velocity, high temperature gases from the combustion apparatus. In the arrangement illustrated, the exahust gases from the gas generator 12 drive a three-stage turbine 14 which in turn drives a two-stage booster compressor 16 located upstream of the gas generator compressor, the booster compressor receiving inlet air through a conventional intake 18. The turbine 14 operates as a power turbine and drives a multibladed propfan 20 via a shaft 22, which has a disconnectable coupling (not shown), and a reduction gear box 24.

The exhaust from the tubine 14 flows into a duct 26 which terminates in a number of equi-spaced chutes 28, 30 formed by a succession of peripheral folds in the end of the duct 26, see section AA in FIG. 2. The chutes 28 contain the turbine exhaust gases and are closed by the inner wall of the duct 26, whilst the chutes 30 are open to receive a flow of ambient air. Thus, alternate flows of turbine exhaust gases and ambient air leave the duct 26 and flow towards a rotating annular hub structure 32 which contains the roots 33 of the propfan blades.

The annular structure 32 includes an inner ring-like structure 34 driven by the output of the reduction gear box 24, to which are attached blade mountings 36 in which the propfan blades can be rotated in bearings 38, 40 by a mechanism 42 to vary blade pitch. An axial duct 44 is formed between each blade mounting 36, and is defined by an outer wall 46 and an inner wall 48, and a fairing 50 is provided upstream of each blade mounting which blends in with the side walls of adjacent ducts 44. The ducts 44 can have discrete outlets, or the side walls of adjacent ducts can be blended together downstream of each blade mounting to form an annular outlet.

The alternate flows of turbine exhaust gases and ambient air are thus exhausted from the engine to atmosphere through the axial ducts 44 in the rotating annular structure 32. As much useful energy as possible is extracted by the turbine, but the gases have sufficient residual energy to enable the gases to finally leave the engine without causing unecessary drag.

The reduction gear box 24 comprises a number of lay shafts 52 supported in bearings 54 and having a gear wheel 56 driven by a gear 58 mounted in bearings 60 and attached to the shaft 22. A gear 62 on each layshaft drives the ring-like structure 34 which is rotatable in bearings 64.

The blades of the propfan 20, which can number between eight and ten, have a high degree of sweep and are of thin section which increases the effective blade chord and delays shockwave formation. This type of blade construction enables higher aircraft speeds to be obtained as compared with a turboprop powered aircraft, the speeds being comparable to the speeds of purejet and turbofan powered civil aircraft and with greater fuel economy than turbofans.

As will have been appreciated, the propulsion engine arrangement described by mounting the propfan to the rear of the propfan driving engine, enables the engine to have a conventional intake unimpeded by the presence of a propfan and gear box, and provides a suitable method of ducting the engine exhaust to atmosphere without causing any detrimental effect to engine performance. The disconnectable coupling in the shaft 22 also enables the propfan driving engine to be easily removed for repair or replacement. By suitable placing of an engine according to the present invention in relation to the aircraft fuselage, it would be possible to reduce or minimise cabin noise generated by the engine. For example, if the engine or engines were to be mounted at the rear of the aircraft on suitable supporting structure such as one or more fins, the sideways noise from the propfan could avoid the fuselage altogether or only affect that part of the fuselage which does not include a passenger cabin.

Various modifications are possible within the scope of the invention, for example, the turbine driving the propfan can be a free power turbine, the reduction gear box can be of any suitable form and the chutes at the outlet of duct 26 can be a different shape.

We claim:

1. An aircraft propulsion engine comprising:
   an annular air intake, a gas generator, a power turbine and an exhaust duct in flow series, said exhaust duct having a downstream end defined by a plurality of adjacent chutes, alternate ones of said adjacent chutes directing flow of exhaust gases and ambient air respectively in a downstream axial direction;
   a propfan assembly positioned at the rear of the aircraft propulsion engine and coaxial with said gas generator, said propfan assembly comprising a plurality of propfan blades, each of said propfan blades having an aerofoil portion and a root portion, a rotatable annular hub structure having inner and outer walls and circumferentially spaced blade mountings, said blade mountings supporting said root portions of said propfan blades, said inner and outer walls and said blade mountings defining axial passages between adjacent blade mountings, said axial passages having inlets aligned with said chutes of the downstream end of said exhaust duct to enable alternate flows of exhaust gases and ambient air to flow through said passages in said rotatable annular hub structure and to exhaust the flows to atmosphere downstream of said propfan assembly whereby exhaust gas flow does not interfere with ambient air flow over said aerofoil portions of said propfan blades;
   and means for rotating said propfan assembly from said power turbine, said means including a shaft and a reduction gearbox operatively connected to said rotatable annular hub structure.

2. An aircraft propulsion engine as claimed in claim 1 including a booster compressor positioned upstream of said gas generator, and means for driving said booster compressor from said power turbine.

3. An aircraft propulsion engine as claimed in claim 1 in which said power turbine is a free turbine having at least one stage and driven by exhaust gases from said gas generator.

* * * * *